March 30, 1926.

L. FLEISCHMANN

SPEED CONTROL SYSTEM

Filed August 11, 1924

1,578,972

Inventor:
Lionel Fleischmann;
by Alexander S. ...
His Attorney

Patented Mar. 30, 1926.

1,578,972

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

SPEED-CONTROL SYSTEM.

Application filed August 11, 1924. Serial No. 731,273.

*To all whom it may concern:*

Be it known that I, LIONEL FLEISCHMANN, a citizen of the United States, residing at Berlin, Germany, have invented certain new and useful Improvements in Speed-Control Systems, of which the following is a specification.

My invention relates to systems for controlling the speed of electric motors, and has for its object the provision of an improved speed control system wherein a rotary converter exciter driven at a speed proportional to that of the motor is utilized to actuate means by which the motor excitation is regulated in a manner to prevent objectionable variations in the motor speed.

In a copending application for Letters Patent, Serial No. 731,272, filed August 11, 1924 I have disclosed a speed control system wherein a motor comprising a main exciting field winding and a regulating field winding is arranged to have its excitation regulated in accordance with the relation between the motor speed and the synchronous speed of a rotary converter which is driven at a speed proportional to that of the motor. In this system, the direct current brushes of the rotary converter are connected to the motor regulating field winding and are so positioned on the converter commutator as to bring the converter commutating axis into alinement with the converter field when the motor is operating at its normal speed. With this arrangement, an increase in the motor speed changes the relation between the converter field and commutating axis in a manner to increase the motor excitation and a decrease in the motor speed decreases the motor excitation. Any change in the motor speed thus immediately brings into action a force which tends to restore it to its normal value.

My invention differs from that disclosed in the aforementioned application in that the rotary converter is utilized to actuate means by which the motor excitation is regulated, and has the advantage that it makes it possible materially to reduce the size of the converter.

My invention will be better understood on reference to the following description when considered in connection with the accompanying drawing and its scope will be pointed out in the appended claims.

Figure 1:
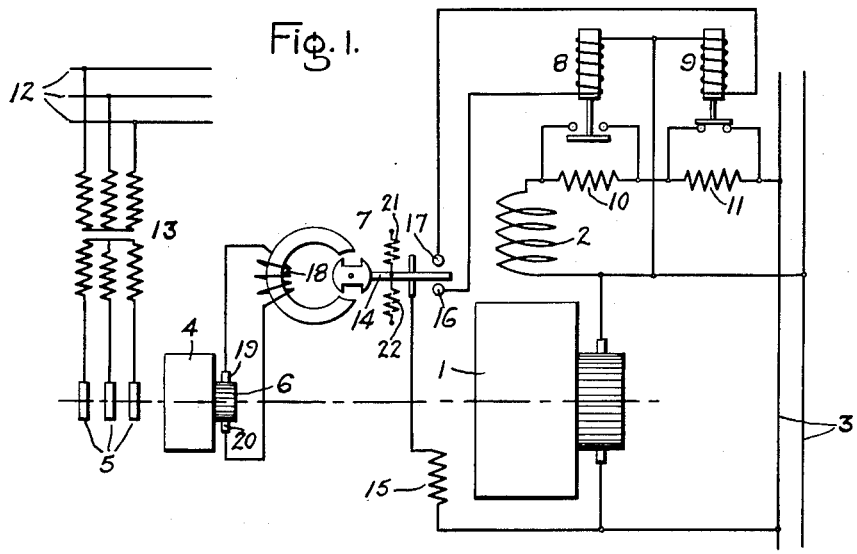
Figure 2:
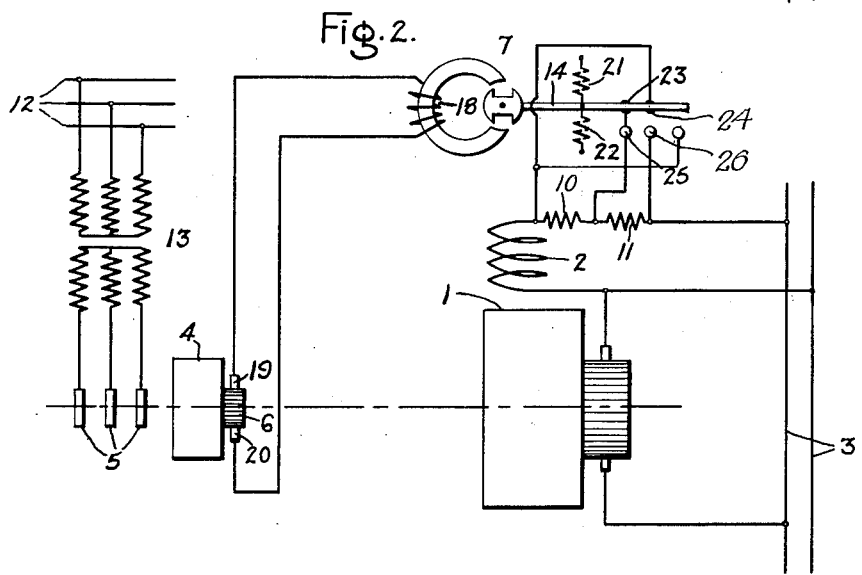

Referring to the drawing, Fig. 1 shows an arrangement in which a current directional relay is arranged to be energized in response to variations in the motor speed for controlling the actuation of relays by which the motor excitation is regulated; and Fig. 2 shows a like arrangement wherein the current directional relay is itself utilized to change the motor field connections.

Fig. 1 shows a direct current motor comprising an armature winding 1 and a shunt field winding 2 which are arranged to be supplied with current through the direct current line 3. A rotary converter comprising an armature winding 4 connected at one end to the slip rings 5 and at the other end to the commutator 6 is arranged to control the operation of a current directional relay 7 which is arranged to actuate the relays 8 and 9 for the purpose of controlling the motor excitation. The relays 8 and 9 are arranged to short circuit the motor field resistors 10 and 11 which are connected in the exciting circuit of the motor. The rotary converter is arranged to be supplied with current from a polyphase source 12 through a transformer 13 and may be mounted on the motor shaft where it is desired to drive the motor at the synchronous speed of the converter. In other cases, the converter must of course be driven at a speed which is proportional to that of the motor.

The current directional relay 7 is provided with a contact member 14 which is biased to mid-position by springs 21 and 22 and arranged to connect the operating coil of the relay 8 across the line 3 in series with a resistor 15 when moved into engagement with the contact 16 and to likewise connect the operating coil of the relay 9 to the line 3 when it is moved into engagement with the contact 17. The resistor 15 is provided to permit the use of a low resistance relay coil. When the operating coils of the relays 8 and 9 are unenergized, the contacts of the relay 8 are open and the contacts of the relay 9 are closed as indicated in the drawing. The operating coil 18 of the current directional relay 7 is so connected as to be energized by current supplied through the direct current brushes 19 and 20 of the converter.

If it is assumed that the converter is supplied with alternating current, that the motor and converter are driven at the synchronous speed of the converter and that the commutating axis and field of the converter are in alinement, it will be readily understood that the brush voltage of the converter is zero. Under these conditions, no current is supplied to the operating coil 18 of the current directional relay 7 and the contact member 14 is in its mid or open position. If the motor speed increases slightly, the operating coil 18 of the relay 7 is actuated in a direction to move the member 14 into engagement with the contact 16, thereby closing the contacts of the relay 8 and increasing the motor excitation in a manner to decrease the motor speed. If the motor speed decreases slightly, the operating coil 18 of the relay 7 is actuated in a direction to move the member 14 into engagement with contact 17, thereby opening the contacts of the relay 9 and decreasing the excitation of the motor in a manner to reduce its speed. Any change in the motor speed thus immediately brings into operation a force which tends to restore this speed to its normal value.

Fig. 2 shows an arrangement which differs from that shown by Fig. 1 in that the relay 7 is itself utilized to control the connections of the motor field resistors. With this arrangement, the contact member 14 is biased to mid-position by means of springs 21 and 22, and in this position interconnects contacts 23 and 24, thereby short circuiting the resistor 10. Upon an increase of the motor speed, the member 14 is moved in a clockwise direction into engagement with contacts 25 and 26, thereby short circuiting the resistors 10 and 11, increasing the motor excitation and decreasing the motor speed as previously indicated. Upon a slight decrease in the motor speed, the contact member 14 is moved in the counterclockwise direction out of engagement with the contacts 23 and 24, thereby inserting both the resistors in the motor field circuit and decreasing the motor excitation in a manner to increase the motor speed.

I have explained my invention by illustrating and describing certain specific embodiments thereof, but it will be readily understood by those skilled in the art that the exact arrangements are not essential to my invention. The terms of the appended claims are, therefore, not restricted to the precise structure disclosed, but are intended to cover all changes within the true spirit and scope of my invention.

What I claim as new and desire to secure by Letters Patent of the United States, is,—

1. A speed control system comprising a motor provided with speed controlling means, a current directional relay for controlling the speed controlling means of said motor, a source of alternating current supply, and a rotatary converter supplied from said alternating current source and arranged to be driven at a speed proportional to the speed of said motor for supplying to said relay a current having its direction determined by the ralation between the speed of said motor and the synchronous speed of said converter.

2. A speed control system comprising a motor having speed controlling means actuated by a plurality of electric relays, a current directional device for controlling the energizing circuits of said relays, a source of alternating current supply, and a rotary converter supplied from said alternating current source and driven at a speed proportional to the speed of said motor for supplying to said device a current having its direction determined by the relation between the speed of said motor and the synchronous speed of said converter.

In witness whereof, I have hereunto set my hand this 18th day of July, 1924.

LIONEL FLEISCHMANN.